United States Patent Office 3,486,862
Patented Dec. 30, 1969

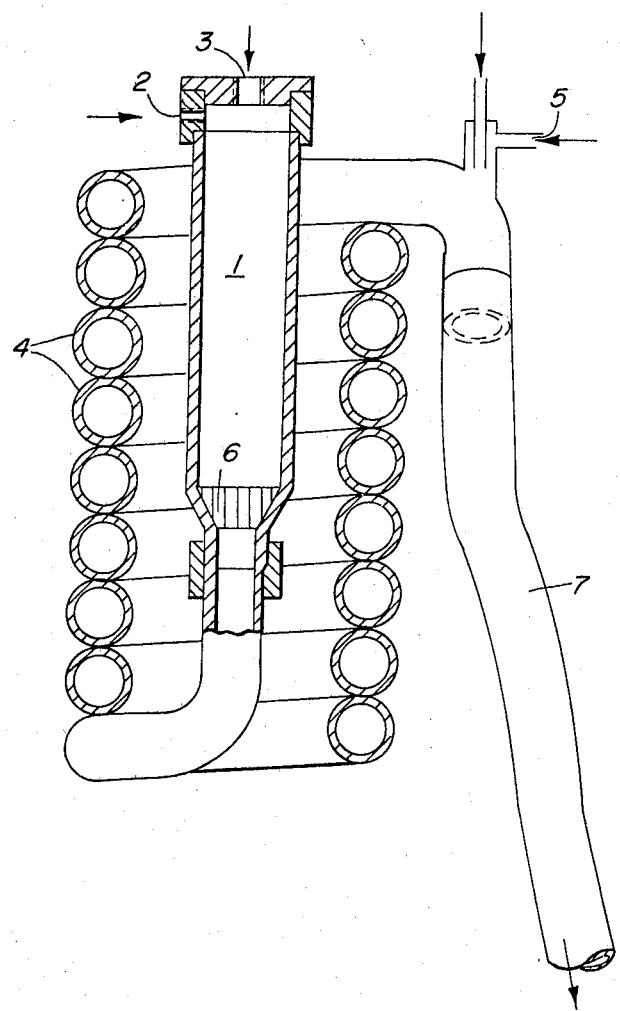

3,486,862
APPARATUS FOR THE CONTINUOUS PRODUCTION OF A FOAMED RESIN
Leo Unterstenhoefer, Limburgerhof, Pfalz, Germany, assignor to Badische Anilin- & Soda-Fabrik Aktiengesellschaft, Ludwigshafen (Rhine), Germany
Filed Sept. 13, 1965, Ser. No. 486,839
Claims priority, application Germany, Sept. 19, 1964, 1,504,022
Int. Cl. B01j 4/00; B29d 27/00; C08j 1/18
U.S. Cl. 23—285
9 Claims

ABSTRACT OF THE DISCLOSURE

Apparatus for producing a foamed synthetic resin which includes a tubular vessel for the production of a foam, a conduit arranged at the inlet end of the vessel for axially introducing a liquid solution of a foaming agent, a second conduit at the inlet end of the vessel for tangentially introducing a compressed gas, a radially inwardly tapering outlet end on the vessel, an elongated tube attached to the outlet end and preferably in the form of a helical coil extending backwardly around the vessel, and a conduit for supplying a solution of the synthetic resin near the outlet end of the elongated tube. The apparatus is especially useful for foaming aqueous solutions of ureaformaldehyde condensates, melamine-formaldehyde condensates or mixtures of these and similar resins which are capable of being cured in the foamed state.

---

The present invention relates to an improved method and an apparatus for the production of foamed resins by mixing a solution of a curable synthetic resin, for example a urea-formaldehyde condensate, and a foamed solution of a foaming agent and curing the resultant foamed resins.

It is known that foamed resins may be prepared by first converting a solution of a foaming agent, which may contain a cure for the synthetic resin, into a foam and mixing this foam with the solution of the synthetic resin.

Apparatus of various kinds are also known which permit continuous performance of the said method. A conventional apparatus comprises for example a stirred vessel which is closed at one end and into which a solution of the foaming agent (to which a cure for the synthetic resin has been added) is injected by means of compressed gas and can be converted into a foam by vigorous stirring. The solution of the synthetic resin is then added to this foam at a point close to the outlet of the vessel. Modifications of this apparatus are provided for example with two separate stirred vessels, the foam being produced in the first vessel and the foam being mixed with the synthetic resin solution in the second vessel. It is also known that the vessel provided for the foaming process may be provided with a frit through which the gas may be forced into the solution of foaming agent.

Carrying out the process by means of the said apparatus requires a fairly large space and the apparatus moreover requires an expensive mechanical drive. Production of foamed resins at any desired place is thus made difficult so that the apparatus is generally used only in one stationary position.

It has also been proposed that the solution of foaming agent and the solution of resin should be sprayed separately with compressed gases and the sprayed products should then be brought together.

In another embodiment of the process, the solution of foaming agent is sprayed into a foaming chamber filled with glass spheres and the resin solution is then injected into the foam thus produced in a subsequent mixing chamber.

The apparatus required for this method is certainly more easy to manage, but their output and the physical properties of the foamed material produced, particularly its density, are determined by the dimensions of the spray nozzles and are variable only within narrow limits. To change the output, it is necessary to change the nozzles. Moreover these apparatus are trouble-prone because of the small orifices in the nozzles which are essential for good spraying. Thus trouble may be caused for example by undischarged cured residues of expanded resins or impurities in the starting components, which make time consuming cleaning of the apparatus necessary.

The object of the present invention is to provide a particularly advantageous process and apparatus for carrying out the process.

In this process, synthetic resin foam materials are similarly prepared from solutions of curable synthetic resins by mixing a foam of a solution of a foaming agent which has been foamed up with a compressed gas with a solution of a synthetic resin and curing the resultant synthetic resin foam. For the production of the foam, however, a solution of a foaming agent is supplied axially to the inlet end of a tubular vessel to which a compressed gas is supplied tangentially, and a solution of a synthetic resin is introduced into the resultant foam in a tube attached to the tubular vessel at its outlet end which is decreased in diameter, near to the end of the said tube.

Apparatus for carrying out the process accordingly comprises a tubular vessel 1 (see the accompanying drawing) for preparing the foam from a solution of a foaming agent, at the inlet end of which there are provided a tangential supply 2 for the compressed gas and an axial supply 3 for the solution of foaming agent. At the narrower outlet end of the vessel 1, a tube 4 (preferably wound in the form of a coil) is provided which near its end is provided with a supply 5 for supplying synthetic resin solution into the foam. If desired, baffles 6, for example louvers, perforated discs or coarse-meshed screens may be provided in the tapered portion of the tubular vessel 1, to convert the predominantly rotary flow of the foam in the vessel 1 into a flow which is mainly parallel to the axis in the attached tube 4. Moreover the tube 4 attached to the tubular vessel 1 may be replaced by tubes having different lengths or different numbers of coils.

It is possible with this process and apparatus to prepare synthetic resin foamed materials continuously in varying amounts per unit of time and with different densities, even directly at the place at which they are to be used.

The process according to this invention and the operation of the apparatus according to the invention will now be described in greater detail:

Gas supplied tangentially at 2 to the vessel 1 produces a zone of decreased pressure in the region of the axis of the vessel. A solution of foaming agent, which may contain the hardener for the synthetic resin solution and which is introduced, for example by means of a metering pump, axially into the said zone through the feed 3 is grasped by the gas flowing in a circular path along the wall of the vessel and is converted into a coarse foam in consequence of the turbulence caused by the different rates of tangential and axial flow of the components. Tapering of the end of the vessel and any guide plates or the like 6 arranged parallel to the axis, act to stop the rotational movement of the coarse foam and to convert it substantially into an axially directed movement. The coarse foam is converted into a fine-pored foam in the following tube 4, which is advantageously wound in the form of a coil. Shortly before leaving the tube (the length of which may be chosen according to the desired density of the foamed material) the synthetic resin solution is supplied to the foam through pipe 5. This may for example be sprayed, pumped or metered in another way into the foam, with or without coemployment of a gas. The synthetic resin solution rapidly mixes with the foam, and the latter is increasingly solidified by the curing of the synthetic resin which immediately sets in. The foamed material, not yet fully cured, may be supplied direct to the desired use through a hose 7 attached to the end of tube 4.

The new type of foamed resin production according to the invention offers considerable advantages over the prior art methods and apparatus. The apparatus, which is particularly suitable for carrying out the process, is small readily transportable but nevertheless makes possible the production of very large amounts of foamed resins. An apparatus of this type, made from plastics, for example polyvinyl chloride or polyethylene, with which up to 20 cubic metres of foamed material can be produced per hour, has a weight of only about 9 kg. The apparatus requires no maintenance because it does not contain any movable parts subject to wear, as for example stirrers. It is not provided with fine nozzles or other parts liable to become clogged. The amount of foamed material which can be produced per unit of time by this process may be varied within wide limits merely by changing the amounts of raw material metered in and without any need to exchange parts of the apparatus. It is also possible according to this process to influence the density of the foamed material produced to a great extent by appropriate choice of the attached length of tube and also by varying the amounts of gas and synthetic resin solution supplied.

Foaming agent solutions in accordance with this invention are defined as solutions of conventional substances used for foam production, for example solutions of alcohol sulfonates. These solutions may have added to them a conventional hardener for the synthetic resin, for example an organic or inorganic acid. Compressed air is used in most cases to foam up the solution of foaming agent. Gases other than air may however also be used, for example gases which impart a sterilizing action to the foamed material produced. Examples of suitable synthetic resin solutions are aqueous solutions of urea-formaldehyde condensates or melamine-formaldehyde condensates, but solutions of mixtures of the same may also be used.

Foamed synthetic resin materials prepared according to this invention may be used for a great variety of purposes, known per se, for example for the production of blocks, boards and other mouldings for packaging or as a substitute for peat.

The invention may be readily duplicated with reference to the following tables which indicate how the density of the foam material prepared according to the process depends on the length of the tube attached to the vessel used for foam production and on the amount of gas supplied (Tables I and II). Table III gives additionally a survey of the way in which it is possible to vary the process according to the invention. A commercial urea-formaldehyde solution is used which contains 380 g. per liter of solid and to which if desired 50 to 250 g. of urea has been added. A commercial foaming agent solution is used, which contains 200 g. of an alkylated naphthalene-sulfonic acid as surface-active agent and 80 g. of phosphoric acid (hardener for the resin) per liter.

The embodiment of apparatus used for these experiments has the following dimensions in millimeters:

Length of the vessel 1 for making the foam _____ 330
Internal width of the vessel _____ 70
Internal width of supply 3 for foaming agent solution _____ 4
Internal width of supply 2 for compressed gas ____ 10
Internal width of attached tube 4 _____ 40
External diameter of a coil of the tube _____ 246
Internal width of the supply 5 for the synthetic resin solution _____ 6

TABLE I

Dependence of the density of the foamed material on the length of the tube attached to the vessel for producing the foam.

Loadings: 6.6 liters per minute of foaming agent solution; 9.4 liters per minute of synthetic resin solution; 26 cu. m./hour (STP) of compressed air.

| | Number of coils | Weight of foamed material in kg./cu.m. | Density of foamed material in g./cc. m. |
|---|---|---|---|
| Length of tube in meters: | | | |
| 1 | | 25 | 0.025 |
| 2 | 3 | 21 | 0.021 |
| 3 | | 18 | 0.018 |
| 4 | 6 | 16 | 0.016 |
| 5 | | 14 | 0.014 |
| 6 | 9 | 13 | 0.013 |

TABLE II

Dependence of density of foamed material on the amount of gas supplied. Length of attached tube: 6 meters.

Loadings: 6.6 l./min. of foaming agent solution; 9.4 l./min. of synthetic resin solution.

| Compressed air in cubic meters (STP) per hour | Weight of foamed material in kg./cu. m. | Density of foamed material in g./cc. m. |
|---|---|---|
| 15 | 16 | 0.016 |
| 16 | 15 | 0.015 |
| 18 | 13.5 | 0.0135 |
| 20 | 12.5 | 0.0125 |
| 22 | 12 | 0.012 |
| 26 | 11 | 0.011 |
| 30 | 10.5 | 0.0105 |

TABLE III

Varied loading of the apparatus; length of attached tube: 6 meters.

| | | | |
|---|---|---|---|
| Rate (liters per minute) of supply of foaming agent solution | 6.5 | 7.5 | 6.5 |
| Rate (liters per minute) of supply of synthetic resin solution | 9.5 | 14 | 14 |
| Amount of compressed air supplied (cubic meters (STP) per hour) | 28 | 17 | 15 |
| Amount of foamed material produced (cu. m./h.) | 32 | 22 | 16.6 |
| Weight of foamed material (kg./cu. m.) | 11 | 15 | 21 |

I claim:
1. Apparatus for the production of a foamed synthetic resin comprising a tubular vessel for the production of foam from a solution of a foaming agent, means for the tangential supply of a compressed gas at the inlet end of said vessel, an axial supply means for the solution of the foaming agent at said inlet end, a tapering outlet end on said vessel, an elongated tube attached to said outlet end of said vessel so as to extend said outlet for a distance of at least about three times the length of said tubular vessel and a supply means for introducing a solution of synthetic resin into said elongated tube at a distance from the outlet end of said tubular vessel of at least about three times the length of said tubular vessel.

2. Apparatus as claimed in claim 1 wherein said elongated tube is wound in the form of a coil.

3. Apparatus as claimed in claim 1 comprising guide means in the tapering portion of the tubular vessel for converting rotary flow into substantially axial flow.

4. Apparatus as claimed in claim 1 wheerin said elongated tube is removable and replaceable by another tube of different length.

5. Apparatus as claimed in claim 1 and made of polyvinyl chloride.

6. Apparatus as claimed in claim 1 and made of polyethylene.

7. Portable apparatus for the continuous production of a foamed synthetic resin comprising:
- a tubular vessel of a diameter sufficient for the production of foam therein from a liquid solution of a foaming agent;
- means arranged at the inlet end of said vessel for axially supplying said liquid solution of a foaming agent;
- means for tangentially supplying a compressed gas at the inlet end of said vessel;
- an outlet end on said vessel which tapers radially inwardly to a diameter smaller than that of the vessel;
- an elongated tube attached to the outlet end of said vessel, said elongated tube being helically coiled backwardly around said vessel and having a diameter smaller than that of the vessel and a length of at least about 3 times that of the vessel and
- means for supplying a liquid solution of the synthetic resin into said helically coiled elongated tube at a distance from the outlet end of said tubular vessel of at least about three times the length of said tubular vessel.

8. Apparatus as claimed in claim 7 wherein the tapering outlet end of said vessel contains guide means for converting rotary flow into substantially axial flow.

9. Apparatus as claimed in claim 7 wherein a delivery hose is attached to the outlet end of said elongated tube as a conduit for the foamed resin.

References Cited

UNITED STATES PATENTS

| | | | |
|---|---|---|---|
| 3,035,902 | 5/1962 | Kurz | 23—252 |
| 3,195,985 | 7/1965 | Elkin | 23—272.8 |
| 3,256,067 | 6/1966 | Shriver et al. | 23—260 |

JAMES H. TAYMAN, JR., Primary Examiner

U.S. Cl. X.R.

23—252, 260; 259—4, 18, 36; 260—2.5; 261—76; 264—50